United States Patent [19]

King

[11] Patent Number: 4,547,976

[45] Date of Patent: Oct. 22, 1985

[54] ADDITION OF FILLERS TO THE BED OF A PARTICLE FORM EVAPORATOR

[75] Inventor: William R. King, Bartlesville, Okla.

[73] Assignee: Phillips Petroleum Company, Bartlesville, Okla.

[21] Appl. No.: 426,433

[22] Filed: Sep. 29, 1982

[51] Int. Cl.$^4$ ............................................... F26B 3/08
[52] U.S. Cl. ........................................ 34/10; 34/57 D
[58] Field of Search ................. 523/330; 34/10, 57 D

[56] References Cited

U.S. PATENT DOCUMENTS

| | | | |
|---|---|---|---|
| 3,400,096 | 9/1968 | Bateman et al. | 523/330 |
| 3,953,389 | 4/1976 | Holliday et al. | 523/330 |
| 4,131,637 | 12/1978 | Bernstein et al. | 523/330 |
| 4,263,091 | 4/1981 | King | 528/503 |
| 4,310,973 | 1/1982 | King | 34/61 |
| 4,316,973 | 2/1982 | Kennedy | 526/348.6 |

*Primary Examiner*—Joseph L. Schofer
*Assistant Examiner*—N. Sarofim
*Attorney, Agent, or Firm*—S. E. Reiter

[57] ABSTRACT

Filler is added to a particle form evaporator to facilitate the creation and maintenance of a polymer particle bed.

15 Claims, 2 Drawing Figures

ADDITION OF FILLERS TO THE BED OF A PARTICLE FORM EVAPORATOR

This invention relates to particle form evaporation. In one aspect this invention relates to the creation and maintenance of a bed of polymer particles in a particle form evaporation process.

BACKGROUND

Solvent can be removed from a polymer solution (or, in other words, polymer can be recovered from a solution) by employing a particle form evaporation process. Particle form evaporation is described, for example, in U.S. Pat. Nos. 4,310,973 and 4,263,091 and in two co-pending patent applications filed on the same day as this application. W. R. King is the sole inventor named in one of the applications. W. R. King and R. E. Elliott are the co-inventors named in the other application. The above-identified patents are incorporated by reference herein. Broadly, particle form evaporation involves introducing a polymer solution into an agitated bed of polymer particles. Typically, the introduction of polymer solution is accomplished by spraying the polymer solution into the bed. There are many variations of the process compatible with my invention. Accordingly, the following more detailed description of particle bed evaporation is intended to be an illustration and should not be interpreted to unduly limit the scope of my invention.

Generally, the polymer solution is comprised of the polymer and, typically, a hydrocarbon solvent such as, for example, cyclohexane or n-hexane. The polymer solution is usually preheated to a temperature sufficiently high to vaporize a substantial portion of the solvent when it is sprayed into the polymer bed but not so high as to cause thermal degradation of the polymer. In the case of a rubbery polymer solution such as butadiene-styrene copolymer in cyclohexane the solution can be preheated up to about 400° F. (204° C.) without encountering the adverse effects of thermal degradation.

Once the polymer solution has been sufficiently heated, the solution is flashed by spraying it into an agitated bed of dry polymer particles. The flashing of the solvent yields porous droplets having a higher concentration of solids. Generally, 25–70 percent of the solvent is removed in the spray flash depending upon the temperature of the solution, the characteristics of the polymer, the viscosity of the solution, and its concentration. The polymer solution can be concentrated by flashing in one or more stages before it is heated and sprayed into the agitated bed of polymer particles. The droplets, which would otherwise coalesce into a viscous mass, are enveloped by hot, relatively dry polymer particles. Agglomerates having a sticky droplet as a core and a coating of dry polymer on the surface are formed.

The bed of polymer particles provides resistance to the mechanical agitation (e.g. rotating mixer blades). As a result of this resistance there is an input of heat into the bed. The mechanical agitation supplies all or a significant portion of the total heat required for the drying process. Rotating blades can be used to provide the agitation of the polymer bed. The term blade is intended to be broadly construed and includes, for example, paddles, rods, pins and the like.

When more energy is required for the drying process it can be supplied by passing a hot inert gas into and through the polymer bed. The energy imparted to the system from the mechanical agitation and the inert gas causes evaporation of substantially all of the remaining solvent from the polymer.

Although other gases could be used, inert gas is used in order to reduce the safety and health hazards associated with other gases such as, for example, hydrocarbon gases, and to minimize oxidation of the hot polymer. Examples of inert gases which can be used include $N_2$, $CO_2$ and fuel gas. The temperature of the inert gas is usually fixed at some temperature above the nomal boiling point of the solvent, but below the point at which significant thermal degradation of the polymer will occur. In the case of drying a butadiene-styrene rubbery copolymer in solution in cyclohexane, an operating temperature of 190°–275° F. is preferred. Since this temperature is above the boiling point of the solvent cyclohexane, the solvent will be vaporized and carried off, yet the polymer will not stick to the equipment since the temperature is either below the softening point of the polymer or the temperature exceeds the softening point only to the extent that the shear forces generated by the agitator are greater than the forces of the polymer causing it to "stick". When at rest the polymer becomes "sticky" and forms a lump. However, when shear forces are applied thereto the polymer tends to form particles. Forces rendering the polymer "sticky" are small compared to the internal shear forces generated by the agitator. Normally "sticky" material remains free flowing in a highly agitated bed, but will block into a lump after it is removed and kept in a static state. At extreme conditions, e.g., operating temperatures that greatly exceed 275° F. in the case of drying a butadiene-styrene copolymer, "stickiness" can become a problem that requires more mechanical shear to overcome.

The temperature of the bed can be controlled by controlling (1) the input of inert gas through the bed of polymer particles, (2) the power input to the agitator, or more preferably (3) the rate at which the polymer solution is added to the bed. Note that the greater the amount of polymer solution added to the bed the lower the temperature of the bed. Conversely, the temperature of the bed will tend to increase as less polymer solution is added. As discussed above, the bed should be maintained at a temperature sufficient to avoid an unacceptable degree of "stickiness." The appropriate temperature of the bed would depend upon such factors as, for example, the polymer and the solvent. If an inert gas is employed, the temperature at which the bed is kept can be substantially the same as the temperature of the inert gas circulating therethrough. For a butadiene-styrene copolymer bed with $N_2$ as the inert gas, the bed is typically maintained at about 190°–275° F.

Substantially dry polymer particles are removed from the bed and optionally passed to a blower-grinder. The particles can be ground and a portion thereof recycled to the bed to facilitate drying. In this manner a fresh supply of fine, dry polymer particles is always available for the bed. The rate of discharge of polymer from the bed may be controlled by a discharge means such as, for example, a slide valve, which is automatically controlled by the motor load of the mechanical agitator. The greater the load on the motor, the more polymer discharged. The smaller the load on the motor, the less polymer discharged.

Particle form evaporation is most readily applicable to any polymer solution which can yield a flowable crumb in the particle form evaporator at a temperature of about 20°–50° F. (11°–28° C.) above the normal boiling point of the solvent.

Some polymers such as, for example, the polybutadienes, are so fluid that even with agitation the tendency towards formation of particles is so weak that the particle form evaporation process can be impracticable as a method for drying the polymer (i.e. removing solvent from the polymer). Successful removal of substantially all of the solvent depends upon creation and maintenance of small polymer particles. My invention makes practicable application of the particle form evaporation process to such polymers and facilitates the processing of polymers already suitable for the particle form evaporation process.

SUMMARY OF THE INVENTION

In accordance with my invention the creation and maintenance of polymer particles in the bed of a particle form evaporation process is promoted and improved by introducing into the bed at least one filler such as, for example, carbon black, clay, silica, pigments and non-rubbery polymers.

OBJECTS OF THE INVENTION

It is an object of my invention to enhance the removal of solvent from a polymer solution.

It is another object of my invention to create and maintain a bed of small polymer particles into which a polymer solution is intorduced in order to recover dried polymer.

These objects and other objects and advantages of my invention will be made apparent from a study of this disclosure and of the appended claims.

DETAILED DESCRIPTION OF THE INVENTION

Figure 1:
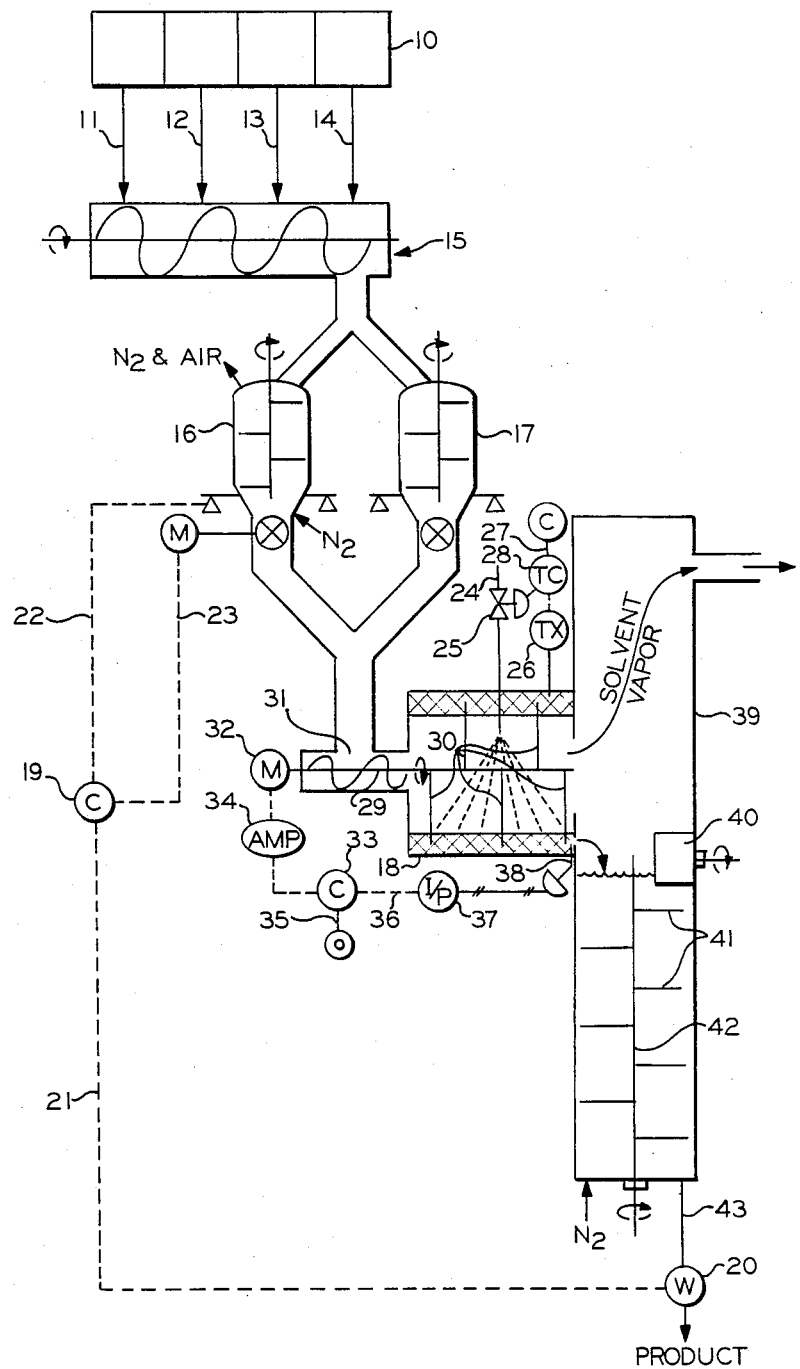
FIG. 1 depicts a particle form evaporation process wherein fillers are added to the particle form evaporation bed.

Most elastomers, plastomers and some plastics are not used as pure polymer but are compounded with a variety of other materials such as carbon black, clay, silica, pigments or even other polymers (such as, for example, polystyrene). Most of these fillers will harden ahd reduce the plasticity of the polymer such that it loses much of its fluidity and becomes more friable.

In accordance with my invention at least one or some of the desired fillers are added to the polymer particle bed before or during the particle form evaporation process rather than to the dried polymer at some later time. This enables one to take advantage of the utility of such fillers to promote and improve the creation and maintenance of small polymer particles.

Although the scope of my invention broadly encompasses polymers in general it is of particular importance to rubbery polymers since they, as a general rule, are best suited for the particle form evaporation process. My invention, although not limited thereto, is of most importance with respect to those rubbery polymers such as, for example, the polybutadienes, which are so fluid as to make the prior art particle form evaporation process an inefficient or even impracticable means of polymer drying or recovery.

Suitable fillers which can be utilized in the drying process include, but are not limited to, those fillers which are commonly added to rubbery polymers, especially the so-called solution rubbers. These fillers are added, for example, to enhance various properties of the product, to change color or simply to extend the polymer to give a lower cost product. Examples of suitable fillers include silica, sand, various forms of calcium carbonate (such as limestone, diatomaceous earth and chalk), clay, hydrated aluminum silicate, magnesium silicate, kaolin, feldspar, mica, aluminum hydroxide, $ZnO$, $ZnS$, $TiO_2$, $BaSO_4$, barytes, asbestos, cotton, jute, wood, nylon, wool and glass. The list can be expanded to include any of the carbon blacks and amorphous or crystalline graphite. Suitable fillers also include non-rubbery polymers such as any of the polymers which are compatible (i.e. mutually soluble) with the rubbery polymer. Suitable non-rubbery polymers include, by way of non-limiting example, the polystyrene polymers whether homopolymer, copolymer, terpolymer, etc. or blends thereof. A specific example that is well suited for this purpose is $\alpha$-methyl polystyrene. It is also possible to use a rubbery polymer as the filler when this rubbery polymer is harder or less sticky than the polymer in solution.

The fillers can either be added to the polymer before introduction of the polymer solution to the particle form evaporator or introduced to the particle form evaporator separate from the polymer solution. It is of course possible to introduce a portion of the fillers with the polymer solution and to introduce the remaining portion of the fillers separately into the same bed.

In accordance with one method for practicing our invention the polymer solution and fillers are combined to form a paste prior to introducing the polymer solution and fillers into the bed of polymer particles in the particle form evaporator. To facilitate formation and processing of the paste an oil such as one of the naphthenic, aromatic or paraffinic extender oils can be added to the mixture. Additional solvent can also be added if desired. By using a paste to introduce the polymer and fillers into the bed the concomitant introduction of air into the particle form evaporator is substantially eliminated.

An inert gas purge (for example $N_2$) can also be used to substantially eliminate air from the system. The inert gas can be used to purge air from the fillers and other materials before they are added to the particle form evaporator.

The rate at which the fillers and the polymer solution are added to the polymer particulate bed can be controlled in response to a signal indicating the temperature of the bed or the rate at which polymer is removed from the bed or the rate at which polymer is removed from a stripping column positioned to receive polymer from the particle form evaporator. Some of the possible control systems are illustrated in FIGS. 1 and 2.

Figure 2:
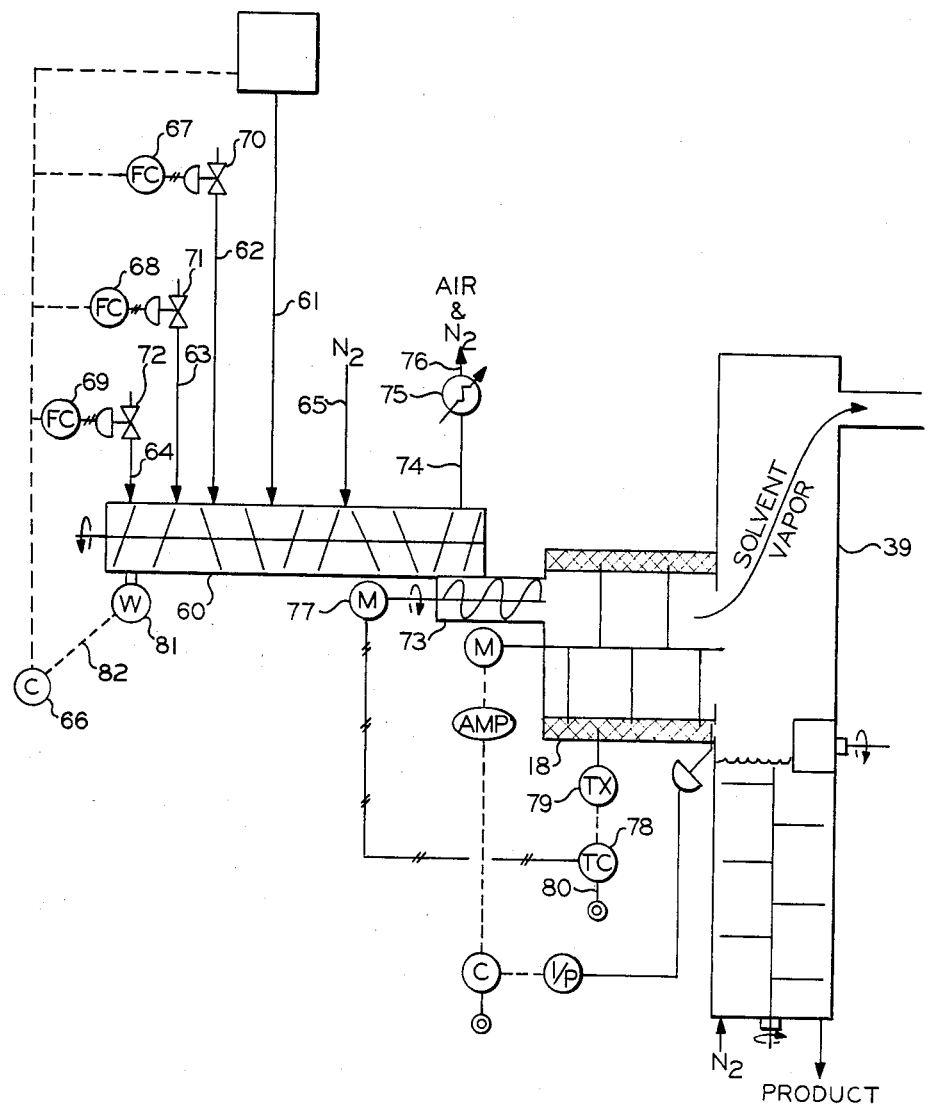
FIG. 2 depicts a particle form evaporation process wherein fillers are combined with polymer solution to form a paste which is extruded into the particle form evaporation bed.

FIG. 1 depicts a particle form evaporation process incorporating one embodiment of my invention. Dry fillers are passed from a weighing and control device 10 through lines 11, 12, 13 and 14 to a ribbon blender 15. It should be noted that each line handles only one filler and that the relative amount of each filler can be controlled by the device 10. The fillers are mixed in the ribbon blender 15 and passed to one of the two loss in weight feeders 16 and 17. While one of the feeders dumps its load at a controlled rate into the particle form evaporator 18 the other feeder receives the mixed fillers from the blender 15. Nitrogen is added near the bottom of each feeder to purge air from the fillers before they are mixed with the polymer solution in the particle form evaporator 18.

A feed rate controller 19 receives a signal 21 from a weighing unit 20 indicating the production rate of the dried product. The controller 19 also receives a signal 22 from the loss in weight feeder 16 or 17 presently feeding the particle form evaporator 18. This signal 22 indicates the weight of the fillers remaining in the feeder 16 or 17. The output from controller 19 is a signal 23 which regulates a valve on the loss in weight feeder 16 or 17 presently in operation. In this manner the desired quantity of the filler mixture is added to the particle form evaporator 18 in response to the production rate. As an alternative to this control scheme the amount of filler mixture added to the particle form evaporator can be slaved to the rate at which polymer solution is introduced into the particle form evaporator.

The polymer solution is fed through line 24 into the particle form evaporator 18. A control valve 25 regulates the amount of polymer solution in response to the temperature in the particle form evaporator 18 as measured by a thermocouple located therein and transmitted by transmitter 26 to temperature controller 28. The temperature controller 28 also receives a set point signal 27. In accordance with this arrangement the controller 28 can manipulate control valve 25 to maintain the desired temperature in the particle form evaporator 18.

The particle form evaporator 18 is a cylinder the axis of rotation of which is horizontally aligned (in other embodiments of this invention the particle form evaporator can be inclined or even vertically aligned). A rotating shaft 29 is fitted with an extruder feeder 31 and blades 30. The extruder feeder 31 forces the filler mixture into the particle form evaporator 18. The blades 30 violently mix and agitate the material in the particle form evaporator 18. The beating action of the blades drives the material to the walls of the cylinder. The particle bed is comprised of this material and is maintained in close proximity to the cylinder walls by the continued beating action of the blades 30. The tip speed of the blades typically ranges from about 43 to about 146 feet per second.

A motor 32 drives the shaft 29. A controller 33 senses the load on the motor by means of amp meter 34 and then compares that reading with the set point 35. As a result of this comparison an output signal 36 is generated. The signal 36 is converted from an electrical signal to a pneumatic signal by transducer 37. Gate 38, in response to this pneumatic signal, controls the flow of polymer (and the fillers now incorporated therein) from the particle form evaporator 18 to a stripping column 39 for further removal of solvent. The load on the motor is a function of the amount of material in the particle form evaporator 18. If the load is greater than desired the gate 38 is opened wider to reduce the particle bed depth and, correspondingly, the load on the motor. This system allows a maximum input of work from the motor to the bed.

The stripping column 39 channels solvent vapor from the particle form evaporator 18 and removes most of the last traces of solvent from the polymer by passing $N_2$ (or other inert gas) through the column. This later objective is facilitated by a grinder 40 and blades 41 attached to a shaft 42 rotated by a motor, not shown in the drawing. The grinder 40 grinds the polymer and throws it upwards to encourage evaporation of the solvent. Typically, the polymer passing through gate 38 to the stripping column 39 contains about 0.06 to 0.08 pounds of solvent per pound of polymer. The polymer removed from the stripping column 39 at 43 typically contains about 0.002 pounds of solvent per pound of polymer. These numbers are, of course, subject to wide variation.

FIG. 2 depicts a particle form evaporation process in which another embodiment of my invention is illustrated. A paste is formed in a low speed extruder-mixer 60 by passing to the extruder-mixer the polymer solution, the fillers, $N_2$, oil and solvent. The fillers are mixed and blended as in FIG. 1 and then passed through line 61 to the extruder-mixer 60. Solvent is added to extruder-mixer 60 through line 62. Polymer solution is added to extruder-mixer 60 through line 63. Oil is added to extruder-mixer 60 through line 64. $N_2$ is added to extruder-mixer 60 through line 65.

The amount of fillers, solvent, polymer solution and oil is controlled in response to signal 82 from weighing unit 81 to controller 66. Signal 82 is a measure of the weight of the extruder-mixer 60 and its contents. Flow controllers 67, 68 and 69 control, respectively, valves 70, 71 and 72 in response to the controller 66. A valve not shown in the drawing is similarly controlled by controller 66 to regulate the flow of fillers into the extruder-mixer 60. $N_2$ is added in an amount sufficient to purge air from the paste formed in extruder-mixer 60.

Oil and solvent are added to facilitate formation of the paste which could otherwise be very difficult in view of the typically large amount of dry fillers used in the process. The extruder-mixer 60 drives the mixture from left to right towards an extruder 73. Near the end of the extruder-mixer 60 a means 74 is provided to allow $N_2$ and air to escape from the system. Some solvent vapor may accompany the escaping $N_2$ and air. The solvent vapor is condensed by condenser 75. The condenser solvent, now in liquid form, falls back through 74 to the extruder-mixer 60. Uncondensed air and $N_2$ are removed from the process through line 76.

The speed of motor 77 determines the transfer rate of the paste mixture from the extruder-mixture 60 to the particle form evaporator 18. A temperature controller 78 sets the motor speed in response to the difference between the temperature in the particle form evaporator 18 (as sensed by a thermocouple and transmitted by transmitter 79) and the desired temperature as indicated by set point 80.

The particle form evaporator 18, the stripping column 39 and the remaining controls are all operated as described in FIG. 1.

I claim:

1. In a process for drying a polymer solution comprising polymer and solvent which comprises introducing the polymer solution into an agitated bed of polymer particles; wherein said bed is mechanically agitated in a manner sufficient to cause evaporation of a substantial portion of said solvent, the improvement comprising introducing at least one filler into said bed; wherein said at least one filler is selected from the group consisting of:
   silica,
   sand,
   calcium carbonate, clay,
hydrated aluminum silicate,
magnesium silicate,
kaolin,
feldspar,
mica,
aluminum hydroxide,
ZnO,
ZnS,
$TiO_2$,
$BaSO_4$,
barytes,
asbestos,
cotton,
jute,
wood,
nylon,
wool,
glass,
carbon black,
amorphous graphite, and
crystalline graphite;
wherein said at least one filler is introduced in an amount sufficient to reduce the average size of said polymer particles in said bed.

2. A process as recited in claim 1 wherein said polymer and said polymer particles are rubbery polymers.

3. A process as recited in claim 1 wherein said polymer solution is sprayed into said bed and said at least one filler is introduced into said bed separate from said polymer solution.

4. A process as recited in claim 1 wherein said polymer solution and said at least one filler are combined and then introduced to said bed in combination.

5. A process as recited in claim 4 wherein said polymer solution and said at least one filler are combined to form a paste; and wherein said paste is introduced into said bed.

6. A process as recited in claim 5 wherein the formation of said paste is facilitated by combining with said polymer solution and said at least one filler at least one member selected from the group consisting of oil and solvent.

7. A process as recited in claim 1 wherein at least two fillers are introduced into said bed.

8. A process as recited in claim 1 wherein said bed of polymer particles is maintained at a temperature above about the boiling point of said solvent.

9. A process as recited in claim 1 wherein polymer particles are removed from said bed and introduced into a stripper column comprising a column and a second bed of agitated polymer particles.

10. A process as recited in claim 8 wherein the rate at which said at least one filler is added to said bed is controlled in response to a signal indicating the temperature of said bed.

11. A process as recited in claim 8 wherein an inert gas is used to purge air from said at least one filler prior to the introduction of said at least one filler into said bed.

12. A process as recited in claim 9 wherein the rate at which said at least one filler is introduced into said bed is controlled in response to a signal indicating the rate at which polymer is removed from said stripper column.

13. A process as recited in claim 8 wherein an inert gas is passed into said bed to facilitate evaporation of said solvent.

14. A process as recited in claim 1 wherein said polymeric filler is polystyrene.

15. In a process for drying a polymer solution comprising polymer and solvent which comprises introducing the polymer solution into an agitated bed of polymer particles; wherein said bed is mechanically agitated in a manner sufficient to cause evaporation of a substantial portion of said solvent, the improvement comprising introducing at least one filler into said bed; wherein said at least one filler is selected from the group consisting of:
a non-rubbery polymeric filler, and
a rubbery polymer; wherein said rubbery polymer is harder or less sticky than said polymer in solution; wherein said at least one filler is introduced in an amount sufficient to reduce the average size of said polymer particles in said bed.

* * * * *

UNITED STATES PATENT AND TRADEMARK OFFICE
CERTIFICATE OF CORRECTION

PATENT NO. : 4,547,976
DATED : 10/22/85
INVENTOR(S) : William R. King

It is certified that error appears in the above—identified patent and that said Letters Patent is hereby corrected as shown below:

Column 8, claim 14, line 1, "1" should be ---15---.

Signed and Sealed this

First Day of April 1986

[SEAL]

Attest:

DONALD J. QUIGG

Attesting Officer

Commissioner of Patents and Trademarks